United States Patent Office 3,391,189
Patented July 2, 1968

3,391,189
N-ALLYL-GUANIDINES AND SALTS THEREOF
Robert Paul Mull, Florham Park, N.J., assignor to Ciba Corporation, New York, N.Y., a corporation of Delaware
No Drawing. Continuation-in-part of application Ser. No. 233,427, Oct. 26, 1962. This application Jan. 13, 1966, Ser. No. 520,351
9 Claims. (Cl. 260—564)

ABSTRACT OF THE DISCLOSURE

Compounds of the formula $$R_a-C=C-CH_2-N-C{\overset{N-R'}{\underset{NH-R''}{\diagdown}}}$$
$$\phantom{R_a-C}H\phantom{=}\underset{R_b}{|}\phantom{-CH_2-N}H$$

in which one of the groups $R_a$ and $R_b$ is methyl and the other is hydrogen or methyl, and each of the groups $R'$ and $R''$ stands for hydrogen and lower alkyl, or acid addition salts thereof, which are useful as hypoglycemic agents.

---

This is a continuation-in-part application of my application Serial No. 233,427, filed October 26, 1962 and now abandoned, which, in turn, is a continuation-in-part of my applications Ser. Nos. 188,532, filed Apr. 18, 1962, and 188,533, filed Apr. 18, 1962 and both now abandoned.

The present invention concerns N-substituted guanidines or salts thereof. Particularly, it relates to compounds of the formula $$R_a-C=C-CH_2-N-C{\overset{N-R'}{\underset{NH-R''}{\diagdown}}}$$
$$\phantom{R_a-C}H\phantom{=}\underset{R_b}{|}\phantom{-CH_2-N}H$$

in which one of the groups $R_a$ and $R_b$ is methyl and the other is hydrogen or methyl, and each of the groups $R'$ and $R''$ stands for hydrogen and lower alkyl, or acid addition salts thereof, as well as process for the preparation of these compounds.

As indicated, one of the groups $R_a$ and $R_b$ stands for methyl. The other is hydrogen or methyl.

The groups $R'$ and $R''$ represent above all hydrogen, but may also be lower alkyl having the above meaning, particularly methyl.

Salts of the compounds of this invention are acid addition salts, such as pharmaceutically acceptable, non-toxic acid addition salts with inorganic acids, e.g. hydrochloric, hydrobromic, nitric, sulfuric, phosphoric acids and the like, as well as with organic carboxylic acids, e.g. acetic, malonic, succinic, maleic, hydroxymaleic, fumaric, malic, tartaric, citric, benzoic, salicyclic acid and the like, or with organic sulfonic acids, e.g. methane sulfonic, ethane sulfonic, 2-hydroxyethane sulfonic, ethane, 1,2-disulfonic, p-toluene sulfonic, 2-naphthalene sulfonic acid and the like. Other salts may be used, for example, as intermediates in the purification of the desired compounds, or in the formation of other salts, as well as for identification and characterization purposes. Salts primarily used for characterization are, for example, those with acidic organic nitro compounds, e.g. picric, picrolonic, flavianic acid and the like, or with metal complex acids, e.g. phosphotungstic, phosphomolybdic, chloroplatinic, Reinecke acid and the like. Semi-, mono- or poly-salts may be formed depending on the procedure used for the preparation of the salts.

The compounds of this invention, when administered orally, cause a considerable lowering of the blood sugar content, and can, therefore, be used as orally active hypoglycemic agents in the treatment of diabetes. They also exhibit cardiovascular properties, such as lowering of the blood pressure and can, therefore, be used, for example, in the treatment of hypertension. It appears that the compounds show rather prolonged pharmacological effects and are less toxic and/or more active than known hypoglycemic agents, e.g. phenformin.

Particularly useful are the compounds of the formula $$R_a'-C=C-CH_2-N-C{\overset{NH}{\underset{NH_2}{\diagdown}}}$$
$$\phantom{R_a'-C}H\phantom{=}\underset{R_b'}{|}\phantom{-CH_2-N}H$$

in which one of the groups $R_a'$ and $R_b'$ is methyl and the other is hydrogen or methyl, and the acid addition salts, particularly the pharmaceutically acceptable, non-toxic acid addition salts, thereof.

The new guanidine compounds of this invention may be prepared according to known methods, for example, by converting in an N-substituted amine of the formula $$R_a-C=C-CH_2-NH_2$$
$$\phantom{R_a-C}H\phantom{=}\underset{R_b}{|}$$

in which each of the groups $R_a$ and $R_b$ have the previously-given meaning, or a salt thereof, the amino group into a guanidino group having the formula $$-NH-C{\overset{N-R'}{\underset{NH-R''}{\diagdown}}}$$

in which $R'$ and $R''$ have the previously-given meaning, and, if desired, converting a resulting salt into the free compound or into another salt, and/or, if desired, converting a free compound into a salt thereof, and/or, if desired, separating a resulting mixture of isomers into the single isomers.

The reagents of choice for the conversion of an amino group into a guanidino group are S-lower alkyl-isothioureas or O-lower alkyl-isoureas, having the formula $$R_o-X-C{\overset{N-R'}{\underset{NH-R''}{\diagdown}}}$$

in which $R'$ and $R''$ have the previously-given meaning, $R_o$ stands for lower alkyl, particularly methyl, as well as ethyl, n-propyl, isopropyl and the like, and X is primarily sulfur, as well as oxygen, or acid addition salts thereof. The latter, which are employed in preference over the free base, are primarily those with mineral acids, such as hydrochloric, hydrobromic, or particularly sulfuric acid and the like. The preferred reagents are the S-methyl-isothioureas, particularly a mineral acid addition salt, e.g. sulfate and the like, thereof. The amine starting material is preferably used in the form of the free base.

The reaction is carried out by contacting the N-substituted amine with the isothiourea or isourea reagent, preferably in the presence of a solvent, the choice of which depends primarily on the solubility of the reactants. Water or water-miscible organic solvents, such as lower alkanols, e.g. methanol, ethanol, propanol, isopropanol, tertiary butanol and the like, water-miscible ethers, e.g. diethyleneglycol dimethylether, p-dioxane, tetrahydrofuran and the like, ketones, e.g. acetone, ethyl methyl ketone and the like, lower alkanoic acids, e.g. acetic acid and the like, formamides, e.g. formamide, N,N-dimethylformamide and the like, or aqueous mixtures of such solvents are the preferred diluents. The reaction may be carried out at room temperature, or, if necessary, at an elevated temperature, for example, on the steam bath or at the boiling temperature of the solvent. An absence of oxygen may be achieved by performing the reaction in the atmosphere of an inert gas, e.g. nitrogen.

Another reagent, capable of transforming an N-substituted amine into the desired guanidine compound, is a cyanamide compound having the formula

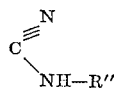

in which R" has the previously-given meaning. For example, a mixture of the cyanamide compound with the N-substituted amine starting material (preferably used in the form of a salt thereof, particularly a mineral acid addition salt, e.g. hydrochloride, hydrobromide, sulfate and the like) is heated to form a melt, which is then dissolved in a suitable solvent, such as a lower alkanoic acid, e.g. acetic acid, and the like, and the desired product is isolated. The reaction may also be performed in the presence of a suitable solvent, such as a lower alkanol, e.g. ethanol and the like. The salt used as the starting material may also be formed in situ by performing the reaction in the presence of an acid, particularly a concentrated aqueous mineral acid, e.g. hydrochloric acid and the like. The cyanamide reagent may also be formed in situ; for example, 1-nitroso-3-methyl-guanidine furnishes the N-methyl-cyanamide during the reaction, and the latter then reacts with the amine to form the desired guanidine compound. The reaction may proceed exothermically, and, if necessary, may be maintained by heating, for example, to from about 80° to about 200°; the atmosphere of an inert gas, e.g. nitrogen, may be advantageous.

A third modification of the general procedure for the manufacture of the compounds of this invention comprises reacting an N-substituted amine starting material having the above-given formula with a salt of a 1-guanyl-pyrazole. A salt of a 1-guanyl-pyrazole is primarily a salt with a mineral acid, such as, for example, nitric acid and the like; the pyrazole nucleus of such reagent may contain additional substituents, particularly lower alkyl, e.g. methyl, ethyl and the like. 1-guanyl-3,5-dimethyl-pyrazole salts, particularly the nitrate thereof, represent the preferred reagents. The reaction may be carried out in the absence of a solvent, for example, by fusing the two reactants, or in the presence of a diluent, such as, for example, a lower alkanol, e.g. ethanol and the like; advantageously, contact with carbon dioxide should be avoided, for example, by performing the reaction in the atmosphere of an inert gas, e.g. nitrogen. The reaction mixture is preferably heated, for example, to the melting point of the mixture or to the boiling point of the solvent.

The compounds of this invention may also be prepared by converting in an N-substituted N—$R_x$-amine of the formula

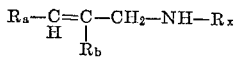

in which $R_a$ and $R_b$ have the above-given meaning, and $R_x$ is a substituent capable of being converted into an amidino group, and, if desired, carrying out the optional steps.

Depending on the character of the substituent $R_x$, its conversion into an amidino group may be carried out according to different methods.

For example, the substituent $R_x$ may contain a carbon atom attached to the nitrogen atom of the amino group in the starting material, and to such carbon atom may be linked another nitrogen atom; in addition, said carbon atom may carry an additional nitrogen atom, as well as other hetero atoms, such as, for example, oxygen or sulfur. The substituent $R_x$ may be represented, for example, by cyano of the formula —C≡N, carbamyl of the formula —CONH—R', in which R' has the above-given meaning, thiocarbamyl of the formula —CSNH—R', lower alkoxy-(imino)methyl of the formula

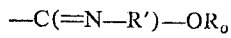

in which $R_o$ has the previously-given meaning, i.e., represents lower alkyl, primarily methyl, as well as ethyl and the like, lower alkyl-mercapto-(imino)methyl of the formula —C(=N—R')—$SR_o$, cyano-amidino of the formula —C(=N—R')—N(R")—C≡N, guanidino-(imino)methyl of the formula

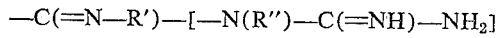

isocyano-(imino)methyl of the formula

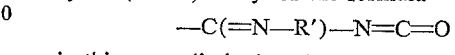

or isothiocyano-(imino)methyl of the formula

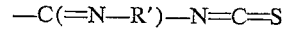

and the like.

Together with the N-substituted amino portion of the starting material, the substituent $R_x$ forms a cyanamide, urea, thiourea, O-lower alkyl-isourea, S-lower alkyl-isothiourea, cyanoguanidine, biguanide, cyanourea or cyanothiourea derivative and the like. All of these compounds have the above-described characteristics, i.e. to the amino group of the amine starting material is attached a carbon atom, which in turn carries at least one nitrogen atom, apart from other nitrogen or hetero atoms.

The plurality of these starting materials are converted to the desired guanidine derivatives by ammonolysis or aminolysis.

For example, a cyanamide is converted into a guanidine compound by treatment with ammonia, an ammonia-furnishing reagent or an amine. This reaction may be carried out, for example, by treating the cyanamide starting material with ammonia, for example, liquid ammonia, aqueous ammonium hydroxide, or with an amine, if necessary, under pressure and/or at an elevated temperature, and/or in the presence of an anion capable of forming a stable salt with a resulting guanidine; amminium acetate, ammonium sulfate, ammonium chloride and the like, may be used as anion sources. Ammonia may be replaced by ammonia-furnishing ammonium salts; such salts are, for example, ammonium monohydrogen phosphate, which may be employed under pressure and at an elevated temperature, or ammonium nitrate, whereby a salt, such as, for example, an alkaline earth metal, e.g. calcium and the like, salt or an alkali metal, e.g. sodium, potassium and the like, salt of the cyanamide starting material is preferably used, and may be reacted with the ammonium nitrate in the presence of catalytic amounts of water.

The starting materials used in the above reaction may be prepared, for example, by treating an N-substituted amine having the previously-given formula, with a cyanogen halide, e.g. cyanogen chloride, cyanogen bromide and the like, advantageously in equivalent amounts and preferably in the presence of an inert solvent, such as, for example, diethylether and the like.

A carbamyl substituent representing $R_x$ in an N-substituted amine starting material may be converted into the desired amidino group treatment with ammonia or an amine, preferably in the presence of a dehydrating agent, such as, for example, phosphorus pentoxide and the like. This reaction may be carried out at an elevated temperature and in a closed vessel; temperature and pressure may be reduced in the presence of a non-aqueous solvent and/or of a reaction accelerator, such as finely dispersed nickel, aluminum, aluminum oxide and the like.

Furthermore, a thiocarbamyl group $R_x$, which, together with the amino group in the N-substituted N—$R_x$-amine starting material, forms a thiourea group, may be converted into an amidino group by treatment with ammonia or an amine, for example, in the presence of water and/or of a non-hydrolytic solvent, such as, for example, toluene and the like, and in the presence of a desulfurizing agent. The latter is selected advantageously from basic oxides, basic carbonates and the like, of heavy metals, such as lead, zinc, cadmium, tin, mercury and the like. Examples of such desulfurizing compounds are, for example, lead oxide, mercuric oxide, lead hydrogen carbonate and the like; mercuric chloride may also be used. The ammonolysis or aminolysis procedure is preferably carried out at an elevated temperature, and, if necessary, in a closed vessel, primarily to avoid loss of ammonia or the amine.

Ureas and thioureas used as the starting material in the above-mentioned modification of the procedure, or salts thereof may be obtained, for example, from an N-substituted amine by treating the latter with an ammonium or a metal, such as alkali metal, e.g. sodium, potassium and the like, cyanate or thiocyanate. These reagents are preferably used in the presence of a solvent, for example, water, and, if necessary, of a small amount of an acid, such as a mineral acid, e.g. hydrochloric, sulfuric acid and the like. They may also be formed by reacting the N-substituted amine with a lower alkyl isocyanate of a lower alkyl isothiocyanate, if necessary, in the presence of a suitable diluent.

The above urea or thiourea starting materials may also be obtained by ammonolysis or aminolysis of reactive functional derivatives of N-substituted carbamic acids, as well as N-substituted thiocarbamic acid. Such reactive functional derivatives are primarily esters, for example, lower alkyl, e.g. methyl, ethyl and the like, esters or halides, e.g. chlorides and the like, of such acids. Upon ammonolysis or aminolysis, if necessary, at an elevated temperature and in a closed vessel, these carbamic and thiocarbamic acids yield the desired urea or thiourea derivative, respectively.

The group of N-substituted O-lower alkyl-isoureas and N-substituted S-lower alkyl-isothioureas or salts thereof, are compounds having the previously-mentioned O-lower alkoxy-(imino)methyl group of the formula $$-C(=N-R')-OR_o$$

and S-lower alkly-mercapto-(imino)methyl group of the formula 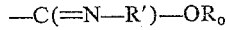, respectively, in which R' and $R_o$ have the previously-given meaning; these compounds may be converted into the compounds of this invention by ammonolysis or aminolysis. Ammonolysis may be carried out by treatment with ammonia, either in its liquid form or as a solution, such as an aqueous solution, thereof, whereby an elevated temperature and/or a closed vessel, as well as the presence of an ammonium salt, such as ammonium chloride and the like, may be required. If necessary, dehydrating agents or desulfurizing agents, such as those previously described, may be added to the reaction medium, depending on the type of starting material used.

The isourea and isothiourea compounds used as the starting materials in the above reaction may be obtained, for example, from the previously-mentioned urea and thiourea derivatives by treatment of the latter or of a metal salt thereof, such as an alkali metal, e.g. sodium, potassium and the like, salt thereof, with a lower alkyl halide, e.g. methyl or ethyl chloride, bromide or iodide and the like, or with a di-lower alkyl sulfate, e.g. dimethyl sulfate, diethyl sulfate and the like. Such reaction may be carried out in the presence of a solvent, the selection of which depends on the type of reagents used; a free urea or thiourea compound may be used in the presence of water or a lower alkanol, e.g. methanol, ethanol and the like, whereas an alkali metal salt of the urea or thiourea compound may be reacted in the presence of a hydrocarbon, e.g. toluene and the like, solution.

A cyanamidino substituent representing $R_x$ in an N-substituted N—$R_x$-amine may be converted into an amidino group by ammonolysis or aminolysis. This reaction may be carried out by treatment with ammonia, as well as with ammonium salt, e.g. ammonium chloride, ammonium nitrate, ammonium sulfate and the like, whereby these salts may also promote ammonolysis with ammonia itself, or by treatment with an amine.

In the ammonolysis or aminolysis procedure of a cyanoguanidino to a guanidino derivative as described above, a biguanido group may be formed as an intermediate, which, upon further treatment with the ammonolysis or aminolysis reagent, may be converted into the desired guanidino group. Such biguanido derivatives may be accessible through other routes (as will be shown below) and are, therefore, also useful as starting materials in the formation of the desired guanidino compounds by treatment with one of the ammonolysis or aminolysis reagents.

A cyano-guanidine derivative may also be converted into the desired guanidino compound by reductive cleavage of the cyano group. Such cleavage may be carried out, for example, by electrolytic reduction on a cathode, such as, for example, a lead cathode.

The cyano-guanidino derivatives or their salts, used as the starting materials in the above ammonolysis, aminolysis or reduction procedure, may be prepared by treatment of an S-lower alkyl-cyano-isothiourea with ammonia or an amine, for example, in the pressure of a lower alkanol, e.g. ethanol and the like, preferably in a sealed tube.

Since the previously-described cyano-guanidine derivatives are obtained by ammonolysis or aminolysis from S-lower alkylcyanoisothiourea compounds, the latter may, therefore, directly serve as starting materials for the preparation of the guanidine compounds of this invention. Ammonolysis or aminolysis of the cyanoisothiourea compounds to the latter may be carried out by treatment with ammonia or an amine in the presence of the anion of a strong acid, such as a hydrohalic, nitric, sulfuric acid and the like, for example, in the presence of the respective ammonium salts of such acids.

The S-lower alkyl-cyanoisothioureas or their salts may be obtained, for example, by treating an N-substituted isothiocyanate with an alkali metal, e.g. sodium and the like, cyanamide and alkylating a resulting 1-substituted 3-cyano-2-thiourea, preferably a salt thereof, with a lower alkyl halide, e.g. methyl or ethyl chloride, bromide or iodide and the like, or with a dilower alkyl sulfate, e.g. dimethyl sulfate, diethyl sulfate and the like, as previously described for the preparation of the S-lower alkyl-isothioureas used as starting materials.

As has been shown, ammonolysis or aminolysis of cyanoguanidines may give rise to the formation of biguanido compounds or salts thereof; the latter may also be prepared, for example, by reacting an N-substituted amine with dicyano-diamide, preferably in the presence of a complex metal-forming salt, e.g. copper sulfate and the like. A resulting biguanido complex metal salt, such as the copper complex salt thereof, may be liberated to form the free compound by treatment with an acid, such as a mineral acid, e.g. sulfuric acid and the like, to form the free compound. As previously described, ammonolysis or aminoylsis of these biguanido derivatives gives rise to the formation of the desired guanidine compounds of this invention.

In addition to these ammonolysis and aminolysis reactions, the guanidine compounds may also be obtained by hydrolysis of an N-substituent N—$R_x$-amine, in which $R_x$ represents a substituent capable of being hydrolyzed to an amidino group. For example, such substituent forms, together with the amino group of the N-substituted amine, a cyanourea or a cyanothiourea compound. Upon treatment with a hydrolytic reagent, particularly with a dilute mineral acid, such as aqueous sulfuric acid and the like, compounds of this type yield the desired guanidino compounds. In such hydrolysis reaction a biuret derivative may be formed as the byproduct.

Cyanourea or cyanothiourea compounds or salts thereof used as the starting materials in the above hydrolysis procedure, may be obtained, for example, by reacting an N-substituted cyanamide with a metal cyanate or thiocyanate, particularly an alkali metal, e.g. sodium or potassium, cyanate or thiocyanate in a neutral medium, for example, in the presence of water.

Apart from N-substituted N—$R_x$-amines, in which $R_x$ is a carbon atom with a substituting nitrogen atom attached to the amino group, other N-substituted N—$R_x$-amines may be useful as starting materials in the conversion to the desired guanidines of this invention. In such a conversion intermediates may be formed, which may have the previously-outlined characteristics, i.e. the carbon atom of the group $R_x$ carries a nitrogen atom. Such groups are, for example, ester groups, formed by a carboxyl, a thionocarboxyl, a thiolocarboxyl or a dithiocarboxyl group with a lower alkanol, as well as halogeno-carbonyl or halogeno-thionocarbonyl groups, in which halogeno represents primarily chloro. Particularly useful starting materials are, for example, the reactive functional derivatives of N-substituted carbamic acids and N-substituted thiocarbamic acids or salts thereof. As shown above, esters, for example, lower alkyl, e.g. methyl, ethyl and the like, esters, or halides, e.g. chlorides, of such acids yield, upon ammonolysis, the corresponding urea and thiourea derivatives. However, if, for example, the ammonolysis or aminolysis of an N-substituted carbamic acid ester is carried out in the presence of a dehydrating agent (such as, for example, an agent used in the conversion of a urea derivative to a guanidine), an N-substituted carbamic acid ester may be converted directly into the desired guanidine compound. Or, an ester of an N-substituted thiocarbamic acid may be subjected to ammonolysis or aminolysis to yield directly the desired guanidine compound, for example, in the presence of a desulfurizing reagent (such as one of those used in the conversion of a thiourea derivative into the desired guanidine compound, e.g. lead oxide and the like).

The carbamic and thiocarbamic acid derivatives used as the starting materials may be prepared according to known methods. For example, upon treatment of an N-substituted amine having the previously-shown formula with phosgene or thiophosgene, which reagents may be used in a slight excess over the amines, the N-substituted isocyanates and N-substituted isothiocyanates, respectively, may be formed. Such cyanate and isothiocyanate compounds may then be converted into esters of carbamic or thiocarbamic acids by treatment with an alcohol, for example, a lower alkanol, e.g. methanol, ethanol and the like, or into the corresponding thiolesters, by treatment with a mercaptan, such as a lower alkyl-mercaptan, e.g. methylmercaptan, ethylmercaptan and the like. The above derivatives may also be obtained by reacting an N-substituted amine having the previously-given formula, with a carbonic acid lower alkyl ester, or, particularly, with a dithiocarbonic acid lower alkyl ester, as well as with a lower alkyl ester of a halogeno-formic acid, such as chloroformic acid, or, primarily, of a halogeno-thioformic acid, such as chlorothioformic acid.

Or, a salt of an N-substituted amine having the previously-shown formula, particularly a hydrohalide, e.g. hydrochloride, thereof, when reacted with phosgene or thiophosgene at an elevated temperature, preferably in a closed vessel, yields the desired N-substituted-carbamic acid chloride and N-substituted thiocarbamic acid chloride, respectively.

A resulting salt may be converted into the free compound in the customary way, for example, by treatment with a strong alkaline reagent, such as aqueous alkali metal hydroxide, e.g. lithium hydroxide, sodium hydroxide, potassium hydroxide and the like, a strong quaternary ammonium anion (hydroxyl ion) exchange resin and the like.

A resulting salt may be converted into another salt according to known methods. For example, a hemi-sulfate may be converted into the mono-sulfate by treating it with another mole of sulfuric acid, or a resulting salt may be treated with a suitable anion exchange resin or with an alkali metal or silver salt of an acid and another salt may be formed.

A free compound may be transformed into an acid addition salt by reacting it, preferably a solution thereof, in an inert solvent or solvent mixture, with an appropriate inorganic or organic acid or a solution thereof, or with a suitable anion exchange preparation, and isolating the salt. Semi-, mono- or poly-salts may be formed, as well as mixed salts.

A resulting mixture of isomers may be separated into the single isomers on the basis of differences in physicochemical properties (solubility, adsorbability and the like). Racemates are resolved according to known methods.

The invention also comprises any modification of the general process, wherein a compound obtainable as an intermediate at any stage of the process is used as the starting material and the remaining step(s) of the process is(are) carried out; also included within the scope of the invention are any new intermediates.

In the process of this invention such starting materials are preferably used which lead to final products mentioned in the beginning as preferred embodiments of the invention.

The following examples ilustrate the invention and are not to be construed as being limitations thereon. Temperatures are given in degrees centigrade.

EXAMPLE 1

A mixture of 6.1 g. of trans-crotyl-amine and 11.9 g. of S-methyl-isothiourea sulfate in 20 ml. of water is refluxed for four hours. After cooling and filtering off the precipitate, the latter is recrystallized from water to yield 9.5 g. of trans-crotyl-guanidine sulfate of the formula

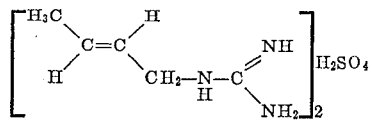

which melts at 228–230° (with decomposition).

The starting material used in the above example is prepared according to the procedure described by Roberts and Mazer, J. Am. Chem. Soc., vol. 71, p. 2508 (1951).

EXAMPLE 2

A mixture of 7.1 g. of 2-methyl-allyl-amine (commercial grade) and 13.9 g. of S-methyl-isothiourea sulfate in 15 ml. of water is refluxed for four hours. After cooling and filtering off the precipitate, the 2-methyl-allyl-guanidine sulfate of the formula

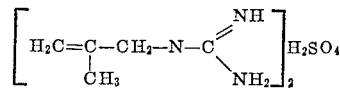

is obtained by recrystallizing the solid material from a mixture of ethanol and water, M.P. 208–210° (with decomposition); yield: 13.2 g.

The 2-methyl-allyl-guaniline sulfate may be converted into the free compound by treatment with a suitable hydroxyl ion exchange preparation, or into the monosulfate by adding another mole of sulfuric acid.

EXAMPLE 3

A solution of 8.8 g. of N-(2-methyl-allyl)-cyanamide and 13.2 g. of ammonium sulfate in 100 ml. of a 15 percent aqueous ammonium hydroxide solution is heated for three hours in an autoclave to about 150° while agitating. Upon cooling and concentrating, the reaction mixture yields the 2-methyl-allyl-guanidine sulfate, M.P. 208–210°.

The starting material used in the above example may be prepared as follows: A mixture of 20.0 g. of 2-methyl-allyl-amine and 30.0 g. of cyanogen bromide in diethyl ether yields the N-(2-methyl-allyl)-cyanamide hydrobromide. The salt is converted into the free compound by treating it with a stoichiometric amount of sodium hydroxide; it may be used in the subsequent conversion to the guanidine compound by using an excess of ammonium hydroxide.

EXAMPLE 4

A solution of 19.3 g. of N-(2-methyl-allyl)-S-methyl-isothiourea sulfate in aqueous methanol is treated with ammonia and mercuric chloride; the mixture is allowed to stand for several hours, the metallic precipitate is filtered off, and the filtrate is made acidic with sulfuric acid. The 2-methyl-allyl-guanidine sulfate, M.P. 208–210°, is recovered by concentrating the aqueous solution and recrystallizing the precipitate from a mixture of ethanol and water.

The starting material used in the above procedure is prepared as follows: a solution of 26.0 g. of N-(2-methyl-allyl)-thiourea (prepared by reacting 2-methyl-allyl-amine in water with sodium thiocyanate, heating and then concentrating the reaction mixture) in water is treated with 13.8 g. of dimethyl sulfate. The exothermic reaction is controlled by external cooling; the reaction mixture is then concentrated to yield N-(2-methyl-allyl)-S-methyl-isothiourea sulfate.

EXAMPLE 5

A mixture of 3.0 g. of cis-crotyl-amine and 5.8 g. of S-methyl-isothiourea sulfate in 10 ml. of water is refluxed for six hours. The crystalline cis-crotyl-guanidine sulfate of the formula

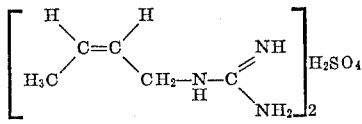

is filtered off and recrystallized from a mixture of ethanol and water, M.P. 207–210°.

The starting material used in the above method is prepared according to the procedure described by Ettlinger and Hodgkins, J. Am. Chem. Soc., vol. 77, p. 1831 (1955).

EXAMPLE 6

A mixture of 14.2 g. of 2-methyl-allyl-amine and 4.02 g. of 3,5-dimethyl-1-guanyl-pyrazole nitrate in 100 ml. of anhydrous ethanol is refluxed for three hours. The solution is concentrated under reduced pressure, and the solid residue is extracted with diethyl ether, using a Soxhlet apparatus. The solid material remaining in the thimble is recrystallized from ethanol (or acetonitrile) to yield the 2-methyl-allyl-guanidine nitrate, M.P. 123–126°.

Other compounds which may be prepared according to the previously-described procedures, using the appropriate starting materials and reagents, are, for example, 2-methyl-2-butenyl-guanidine, 1-(2-methyl-allyl)-2,3-dimethyl-guanidine, 2-ethyl-allyl-guanidine and the like, particularly salts thereof, such as the sulfate, the nitrate and the like.

EXAMPLE 7

The new compounds of this invention may be used in the form of compositions for enteral or parenteral use, which contain the new guanidine compounds in admixture with a suitable organic or inorganic, solid or liquid carrier. For making up the preparations there may be employed substances which do not react with the new compounds, such as water, gelatine, lactose, starches, stearic acid, magnesium stearate, calcium stearate, stearyl alcohol, tragacanth, talc, vegetable oils, benzyl alcohols, gums, propylene glycol, polyalkylene glycols or any other known carrier used in such preparations. The latter may be in solid form, for example, as capsules, tablets, dragees and the like, or in liquid form, for example, as solutions, suspensions, emulsions and the like. If desired, they may contain auxiliary substances, such as preserving, stabilizing, wetting, emulsifying, coloring, flavoring agents and the like, salts for varying the osmotic pressure, buffers, etc. They may also contain, in combination, other useful substances.

Compositions included within the scope of this invention contain from about one percent to about fifty percent of a compound having the formula

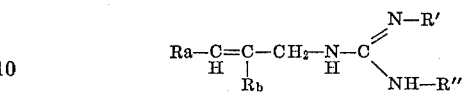

in which $R_a$, $R_b$, $R'$ and $R''$ have the previously-given meaning, or an acid addition, particularly a pharmaceutically acceptable, non-toxic acid addition, salt thereof, together with a carrier. For example, compositions for oral administration contain from about 0.01 g. to about 0.05 g. per single dosage unit of a compound having the above formula, particularly of a compound of the formula

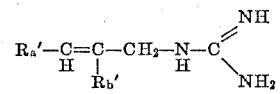

in which $R_a'$ and $R_b'$ have the previously-given meaning, or an acid addition salt, particularly a pharmaceutically acceptable, non-toxic acid addition, salt thereof, as the pharmacologically active ingredient.

Tablets containing 0.025 g. of 2-methyl-allyl-guanidine sulfate may be prepared as follows (for 700,000 tablets).

Ingredients:

| | | |
|---|---|---|
| 2-methyl-allyl-guanidine sulfate | g | 17,500.0 |
| Calcium stearate | g | 525.0 |
| Colloidal silica | g | 5,250.0 |
| Corn starch | g | [1] 13,130.0 |
| Corn starch | g | [1] 4,750.0 |
| Lactose | g | 154,175.0 |
| Stearic acid powder | g | 2,100.0 |
| Sugar (confectioner's) | g | 14,700.0 |
| Deionized water | ml | 30,000.0 |

[1] The total is the equivalent of 15,750.0 g. of anhydrous corn starch.

The 2-methyl-allyl-guanidine sulfate, the sugar and 13,130.0 g. of corn starch are passed through a Fitzpatrick comminuting machine set at low speed, with knives forward and using a Type A, No. 2 screen, and placed into a mixer. The lactose (previously screened through a No. 16 screen) and the colloidal silica are added and mixing at low speed (34 r.p.m.) is maintained for twenty minutes. A paste is formed by suspending 4,750.0 g. corn starch in 6,000 ml. of cold, deionized water, adding 24,000.0 ml. of boiling deionized water and stirring until the paste becomes smooth. The hot paste is added to the above mix to form the granulate, which is passed through a Fitzpatrick comminuting machine set at low speed, with knives forward and using a Type A, No. 4A screen. The wet mass is placed on trays and dried at 37.5° (maintained with circulating dehumidified air) until the moisture content is from 2% to 3%. The dried granules are ground in a Tornado comminuting machine at medium speed, using four knives and a No. 16 mesh screen; the ground material is placed into a mixer, the stearic acid powder and the calcium stearate (both previously screened through a No. 20 mesh screen) are added, and mixing at low speed is maintained for twenty minutes. The granulate is then compressed into tablets weighing 0.3 g., using $^{12}/_{32}''$ standard concave punches.

What is claimed is:

1. A member selected from the group consisting of an N-substituted guanidine of the formula

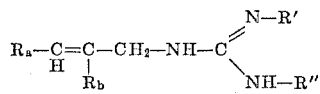

in which one of the groups $R_a$ and $R_b$ is lower alkyl and the other is a member selected from the group consisting of hydrogen and lower alkyl, and each of the groups R' and R" stands for a member selected from the group consisting of hydrogen and lower alkyl, and a therapeutically useful acid addition salt thereof.

2. A compound of claim 1, which is a member selected from the group consisting of a compound of the formula

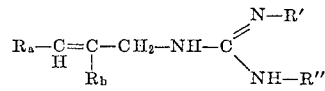

in which one of the groups $R_a$ and $R_b$ is methyl, and the other is a member selected from the group consisting of hydrogen and methyl, R' is hydrogen and R" is hydrogen, and a therapeutically useful acid addition salt thereof.

3. A compound of claim 1, which is a member selected from the group consisting of 2-methyl-allyl-guanidine and a therapeutically useful acid addition salt thereof.

4. A compound of claim 1, which is 2-methyl-allyl-guanidine sulfate.

5. A compound of claim 1, which is 2-methyl-allyl-guanidine nitrate.

6. A compound of claim 1, which is a member selected from the group consisting of trans-crotyl-guanidine and a therapeutically useful acid addition salt thereof.

7. A compound of claim 1, which is trans-crotyl-guanidine sulfate.

8. A compound of claim 1, which is a member selected from the group consisting of cis-crotyl-guanidine and a therapeutically useful acid addition salt thereof.

9. A compound of claim 1, which is cis-crotyl guanidine sulfate.

References Cited

Majima, "Berichte," vol. 41, pages 176–186 (1908).

Parturier et al.: "Chemical Abstracts," vol. 29, page 373 (1935).

Shass, "American Journal Pharm.," vol. 117, pages 72–74 (1945).

CHARLES B. PARKER, *Primary Examiner.*

R. V. HINES, *Assistant Examiner.*